United States Patent
Sherratt et al.

(10) Patent No.: US 10,341,448 B2
(45) Date of Patent: Jul. 2, 2019

(54) NOTIFICATION EXTENSIONS FOR APPLICATIONS

(71) Applicant: Apple Inc., Cupertino, CA (US)

(72) Inventors: Benjamin T. Sherratt, Sunnyvale, CA (US); Michele Campeotto, San Francisco, CA (US); Matthew E. Shepherd, Mountain View, CA (US)

(73) Assignee: Apple Inc., Cupertino, CA (US)

(*) Notice: Subject to any disclaimer, the term of this patent is extended or adjusted under 35 U.S.C. 154(b) by 284 days.

(21) Appl. No.: 15/462,167

(22) Filed: Mar. 17, 2017

(65) Prior Publication Data

US 2017/0359431 A1 Dec. 14, 2017

Related U.S. Application Data

(60) Provisional application No. 62/349,051, filed on Jun. 12, 2016.

(51) Int. Cl.
 *G06F 15/16* (2006.01)
 *H04L 29/08* (2006.01)
 *H04L 12/58* (2006.01)

(52) U.S. Cl.
 CPC ........... *H04L 67/26* (2013.01); *H04L 51/10* (2013.01); *H04L 67/20* (2013.01); *H04L 67/34* (2013.01)

(58) Field of Classification Search
 CPC ......... H04L 67/20; H04L 67/26; H04L 67/34; H04L 51/10
 See application file for complete search history.

(56) References Cited

U.S. PATENT DOCUMENTS

| | | | |
|---|---|---|---|
| 9,451,039 B1* | 9/2016 | Kay | G06F 21/00 |
| 2012/0071230 A1* | 3/2012 | Lagercrantz | G07F 17/32 463/22 |
| 2015/0215384 A1* | 7/2015 | Bannai | H04L 47/783 709/201 |
| 2015/0222512 A1* | 8/2015 | Kay | G06F 16/957 709/224 |
| 2015/0296025 A1* | 10/2015 | Okabayashi | H04L 67/141 709/201 |
| 2016/0110059 A1* | 4/2016 | Li | H04M 1/72519 715/825 |
| 2016/0261627 A1* | 9/2016 | Lin | H04W 4/18 |
| 2016/0344679 A1* | 11/2016 | Lane | G06F 17/212 |
| 2017/0279790 A1* | 9/2017 | Ogawa | G06F 21/34 |
| 2018/0348881 A1* | 12/2018 | Chung | G06F 3/01 |

* cited by examiner

*Primary Examiner* — Jonathan A Bui
(74) *Attorney, Agent, or Firm* — Invoke

(57) ABSTRACT

In some implementations, a computing device can use notification extensions for applications to preprocess a notification received by the computing device and present content associated with a notification. For example, applications installed on the computing device can provide a service extension for preprocessing the notification. When a notification associated with the application is received, the notification system on the computing device can invoke the service extension for the application to preprocess the notification (e.g., to download additional content, encrypt/decrypt notification data, etc.). Applications can provide content extensions to present notification content. For example, a content extension associated with the application can be invoked by the notification system to present media content (or other content) associated with a received notification in an application specific manner.

18 Claims, 7 Drawing Sheets

NOTIFICATION EXTENSIONS FOR APPLICATIONS

RELATED APPLICATION

This application claims the benefit U.S. Provisional Application No. 62/349,051, filed on Jun. 12, 2016, and which is incorporated herein by reference.

TECHNICAL FIELD

The disclosure generally relates to presenting notifications on a computing device.

BACKGROUND

Notifications (e.g., push notifications) to allow one device to notify another device when an event occurs. For example, an email server can send a push notification to a mobile device to notify the mobile device that a new email has arrived for the user of the mobile device. A social media server can send a push notification to a mobile device to notify the mobile device that a new post has been submitted to a social media website. Often these push notifications are directed to a particular application on the mobile device. For example, the email server can have a corresponding email application for viewing emails on the mobile device. The social media server can have a corresponding social media application on the mobile device for viewing content in a social media website. In turn, the mobile device can present a notification on the display of the mobile device to inform the user about the notification so that the user can take appropriate action. Because notifications are limited in the amount of data they include, the user will often invoke an application corresponding to the sending device or service (e.g., email service, social media service) to view additional content related to the notification response to viewing a notification. However, invoking a separate application to view additional notification content uses additional memory resources and provides an inconvenient user experience, especially when the user wishes to just take a quick look at content related to the notification.

SUMMARY

In some implementations, a computing device can use notification extensions for applications to preprocess a notification received by the computing device and present content associated with a notification. For example, applications installed on the computing device can provide a service extension for preprocessing the notification. When a notification associated with the application is received, the notification system on the computing device can invoke the service extension for the application to preprocess the notification (e.g., to download additional content, encrypt/decrypt notification data, etc.). Applications can provide content extensions to present notification content. For example, a content extension associated with the application can be invoked by the notification system to present media content (or other content) associated with a received notification in an application specific manner.

Particular implementations provide at least the following advantages. Notifications can be preprocessed and presented by the notification system without incurring the additional overhead of invoking a separate application to process the notification and present notification content. The user may enjoy a smoother user experience because the user can view application content related to the notification without leaving the notification interface. Third party application vendors can have more control over how their notifications are processed and presented by the notification system.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

System Overview

Figure 1:
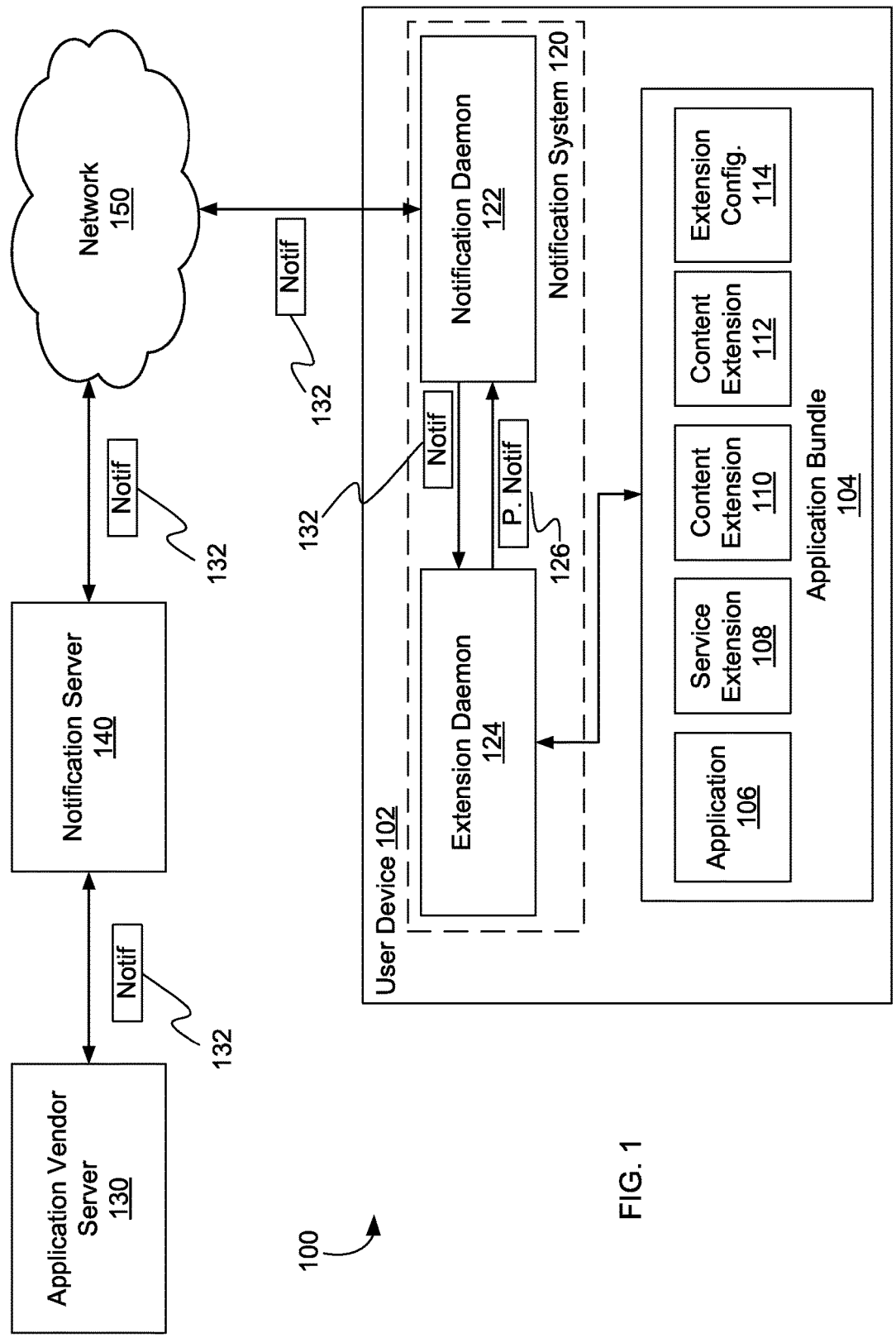
FIG. 1 illustrates an example system for processing notifications using notification extensions for applications.

FIG. 1 illustrates an example system 100 for processing notifications using notification extensions for applications. For example, system 100 can allow an application vendor to provide a service extension and/or content extensions with the vendor's application for preprocessing and presenting notification content. When a notification is received at the user's device, a notification system on a user's device can invoke the service extension and/or a content extension to process notifications associated with the application to perform application-specific preprocessing of the notification and/or present content associated with the notification in an application-specific manner. Thus, the application vendor can provide a customized notification experience.

In the description that follows, the term "notification" can mean a notification message sent between devices and/or systems within devices and/or a graphical notification presented on a display of a device that represents data or content associated with a notification message.

In some implementations, system 100 can include user device 102. For example, user device 102 can be a computing device, such as a laptop computer, a tablet computer, a smartphone, a wearable device (e.g., smart watch, smart glasses, etc.), an automobile infotainment system (e.g., in-dash audio/video system), and/or a media device (e.g., set-top-box, television, streaming media player, etc.).

In some implementations, user device 100 can be configured with various applications (e.g., application 106). For example, the applications can be first party applications created by the manufacturer (e.g., first party vendor) of user device 100 or the manufacturer of the operating system of user device 100. The applications can be third party applications created by application vendors (e.g., third party vendors) different than the manufacturer of user device 100 or its operating system.

The Application Bundle

In some implementations, applications installed on user device 102 can be installed with an application bundle (e.g., application bundle 104). Application bundle 104 can include application 106. For example, application 106 can be a client application that provides user interfaces for interacting with a service (e.g., website, server, etc.) provided by the vendor of application 106 and/or application bundle 104. For example, application 106 can provide client-side functionality (e.g., graphical user interfaces, data processing, etc.) for application vendor server 130 (e.g., an email server, social media website server, etc.).

In some implementations, application bundle 104 can include service extension 108. For example, service extension 108 can be created by the application vendor to preprocess notification messages associated with application 106. Service extension 108 can be invoked and run as a separate process from notification system 120 of user device 102. When invoked, service extension 108 can be dynamically loaded into notification system 120 to provide vendor-specific processing of notification messages. For example, when invoked by notification system 120 of user device 102, service extension 108 can encrypt/decrypt the content of a notification message according to a vendor-defined encryption method, download additional content referenced by the notification message from vendor-specified sources, and/or perform any other notification message preprocessing desired by the application vendor (e.g., sending read receipts for the notification message, obfuscating notification message content, etc.).

In some implementations, application bundle 104 can include content extension 110 and/or content extension 112. For example, a content extension can provide vendor-specific functionality for presenting content within a graphical notification, as described herein below. Each content extension (e.g., content extension 110, content extension 112, etc.) bundled with an application can be associated with a category (e.g., a vendor-specified label). For example, content extension 110 can correspond to a "video" category and, when invoked by notification system 120, can present video content within a graphical notification. Content extension 112 can correspond to category "B" and, when invoked by notification system 120, can present a photo album, text messaging interface, or some other graphical user interface features within a graphical notification presented by notification system 120. For example, the content extensions 110 and 112 can define the look, feel, and presentation of notification content or graphical user interface elements (e.g., buttons, controls, etc.) within an area of a graphical notification presented by notification system 120, as described further below.

In some implementations, application bundle 104 can include extension configuration 114. For example, extension configuration 114 can be a file or other data object delivered with application bundle 104 that specifies configuration data for application 106 and/or application notification extensions 108, 110, and 112. Extension configuration 114 can include an identifier (e.g., system location, path, etc.) for application 106. Extension configuration 114 can include an identifier (e.g., system location, path, etc.) for service extension 108. Extension configuration 114 can include identifiers (e.g., system location, path, etc.) for content extensions 110 and/or 112.

In some implementations, extension configuration 114 can include category labels and definitions for the categories. For example, for each category label (e.g., each category) extension configuration 114 can identify the content extension for the category. For example, category "video" can be mapped to (e.g., associated with) the identifier for content extension 110 in extension configuration 114. Category "B" can be mapped to the identifier for content extension 112.

In some implementations, extension configuration 114 can identify actions associated with a category. For example, an application vendor can define actions for a category by providing action labels. For example, category "video" can be mapped to a "play" action and a "share" action. Category "B" can be mapped to a "previous" action, a "next" action, and a "share" action. For example, these action labels can be used for handling user input to graphical controls (e.g., buttons) associated with the labels. By associating the action labels to the categories, the application vendor is telling notification system 120 that the content extension associated with the category should be called whenever a user input associated with an action label mapped to the category occurs.

Continuing the example above, when a notification message is received by notification system 120 that specifies the "video" category, notification system 120 can invoke content extension 110. Content extension 110 can present a graphical control associated with the "play" action label. For example, the graphical control can be provided by and/or handled by notification system 120 but the configuration of the graphical control (e.g., placement, text label, etc.) can be determined or specified by content extension 110. When the user selects the graphical control associated with the "play" action label, notification system 120 can determine, based on the mappings in configuration 114, that content extension 110 should be called when an action associated with the "play" label is detected and send a message to content extension 110 so that content extension 110 can respond to the user selection of the graphical control. Thus, even though notification system 120 provides the graphical control and initially handles the user input, content extension 110 can be called to perform an operation (e.g., play a video, like some social media content, advance to the next image, etc.) in response to the user selection of the graphical control associated with the "play" label.

In some implementations, application notification extensions can be registered with notification system 120. For example, when application bundle 104 in installed on user device 120, extension configuration 114 can be registered with notification system 120 so that notification system 120 can determine how to process notification messages received for application 106. For example, a notification message received by notification system 120 can include an application identifier, data (e.g., true/false) indicating whether the application service extension should be invoked, and/or a content extension category. For example, notification system 120 receives a notification message identifying application 106, notification system 120 can use the application identifier in the notification message to obtain extension configuration 114. Notification system 120 can locate and/or invoke service extension 108 based on extension configuration 114 if the notification message indicates that service extension 108 should be invoked. Notification system 120 can locate and/or invoke content extension 110 and/or 112 (e.g., according to the category specified in the notification message) based on extension configuration 114.

The Notification System

In some implementations, user device 102 can include notification system 120. For example, notification system 120 can be part of the operating system of user device 102. As described above, notification system 120 can handle or process notifications received by user device 120. For example, notification system 120 can receive and process notification messages generated internally (e.g., by applications) to user device 120 and notification messages generated externally (e.g., by external servers) to user device 120. Since notification messages generated internally to user device 102 are typically generated by the applications installed on user device 102, the application-specific processing for the notification messages is typically done by the sending application before sending the notification message. Thus, no additional application-specific processing is required for these internally generated notification messages.

However, to reduce the networking overhead related to transmitting and processing externally generated notification messages, external notification messages are limited in size and may not have the space for content that exceeds the size restrictions of these externally generated notification messages. Thus, application vendors can provide service extensions and/or content extensions to add content to the notification messages and present the added content after the notification messages arrive at user device 102.

Moreover, application vendors may provide application service extensions to transmit notification message content in a secure manner controlled by the vendor. For example, when a user uses application 106 to create an account with application vendor server 130, application vendor server 130 and application 106 can exchange cryptographic keys so that application 106 and application vendor 130 can exchange data in a secure manner. For example, application vendor server 130 can send encrypted content to application 106 and application 106 can decrypt the content for presentation to the user according to well-known encryption methods. Similarly, vendor server 130 can send encrypted content in a notification message to user device 102. Notification system 120 on user device 102 can invoke service extension 108 to process the notification message and decrypt the content using the vendor encryption key provided to application 106 before presenting the corresponding graphical notification to the user.

In some implementations, notification system 120 can include notification daemon 122. For example, notification daemon 122 can be a client of notification server 140 that receives notifications from notification server 140. Notification daemon 122 can be a background process that manages notifications for user device 102. In some implementations, notification daemon 122 can present graphical notifications on a display of user device 102.

For example, application vendor server 130 can send notification message 132 to notification server 140. Vendor server 130 can format notification 132 according to a structure or protocol defined for sending notification messages to notification server 140, for example. Notification message 132 can, for example, identify user device 102, identify application 106, specify that service extension 108 should be invoked to process notification message 132, specify a category (e.g., "video", "B", etc.), and include a notification message payload (e.g., encrypted content, a message, text, etc.).

When notification server 140 receives notification message 132, notification server 140 can determine which device (e.g., user device 102) notification message 132 should be delivered to based on the device identifier in notification message 132 and deliver the notification message to notification daemon 122 on user device 102 through network 150. For example, network 150 can be a local area network (LAN), wide area network (WAN), wireless LAN, cellular data network, etc.

When notification daemon 122 receives notification message 132, notification daemon 122 can send notification message 132 to notification extension daemon 124. For example, notification daemon 122 can determine that notification message 132 indicates that notification message 132 should be processed by service extension 108. Notification daemon 122 can determine that notification message 132 identifies a category for notification message 132. When notification daemon 122 determines that notification message 132 should be processed by service extension 132 and/or identifies a category for the message, notification daemon 122 can send notification message 132 to extension daemon 124 for processing.

In some implementations, notification daemon 122 will only send notification message 132 to extension daemon 124 when a graphical notification corresponding to notification message 132 will be presented to the user on a display of user device 102. For example, notification system 120 can process user visible notifications and background notifications. To prevent an application vendor from over consuming battery power and network bandwidth by sending an excessive number of notifications to be processed by extension daemon 124, notification daemon 122 will only send user visible messages to extension daemon 124. Thus, if the application vendor sends too many notifications, the user will see the notifications and know that the application vendor is responsible for consuming battery power and network data on user device 102. The user can then take remedial action, such as removing the application vendor's application bundle from user device 102.

In some implementations, extension daemon 124 can manage service extensions and/or content extensions for notifications received by notification daemon 122. For example, in response to receiving notification message 132, notification daemon 124 can determine that notification message 132 indicates that service extension 108 for application 106 should be invoked to process content (e.g., the payload) of notification message 132. When extension daemon 124 determines that service extension 108 should be invoked, extension daemon 124 can invoke service extension 108 and provide the payload (e.g., content, data, URL, encrypted data, etc.) of notification message 132 to service extension 108 for processing. For example, service extension 108 can process the notification payload by modifying or replacing the payload data with content downloaded from a network resource, an identifier for a network connection established by service extension 108 to vendor server 130, or any other data resulting from service extension 108 processing the payload data.

After service extension 108 processes the notification payload, extension daemon 124 can send processed notification message 126 to notification daemon 122. For example, processed notification message 126 can include the processed (e.g., modified or replacement) payload data generated by service extension 108. After receiving processed notification message 126, notification daemon 122 can present an initial graphical notification on a display of user device 102.

In some implementations, extension daemon 124 can allow service extension 108 a limited amount of time to process notification message 132. For example, extension daemon 124 can provide 30 seconds for service extension to process notification message 132. After 30 seconds passes from receipt of notification 132, extension daemon 124 can send a message to service extension 108 indicating that the time limit for processing notification message 132 has expired. For example, the message can provide service extension 108 an opportunity to provide content for processed notification 126. If service extension 108 has not finished processing notification message 132, service extension 108 can provide (e.g., preconfigured) default content to extension daemon 124 for inserting into processed notification 126.

Example Use Case—Encrypted Video Notification

Figure 2A:
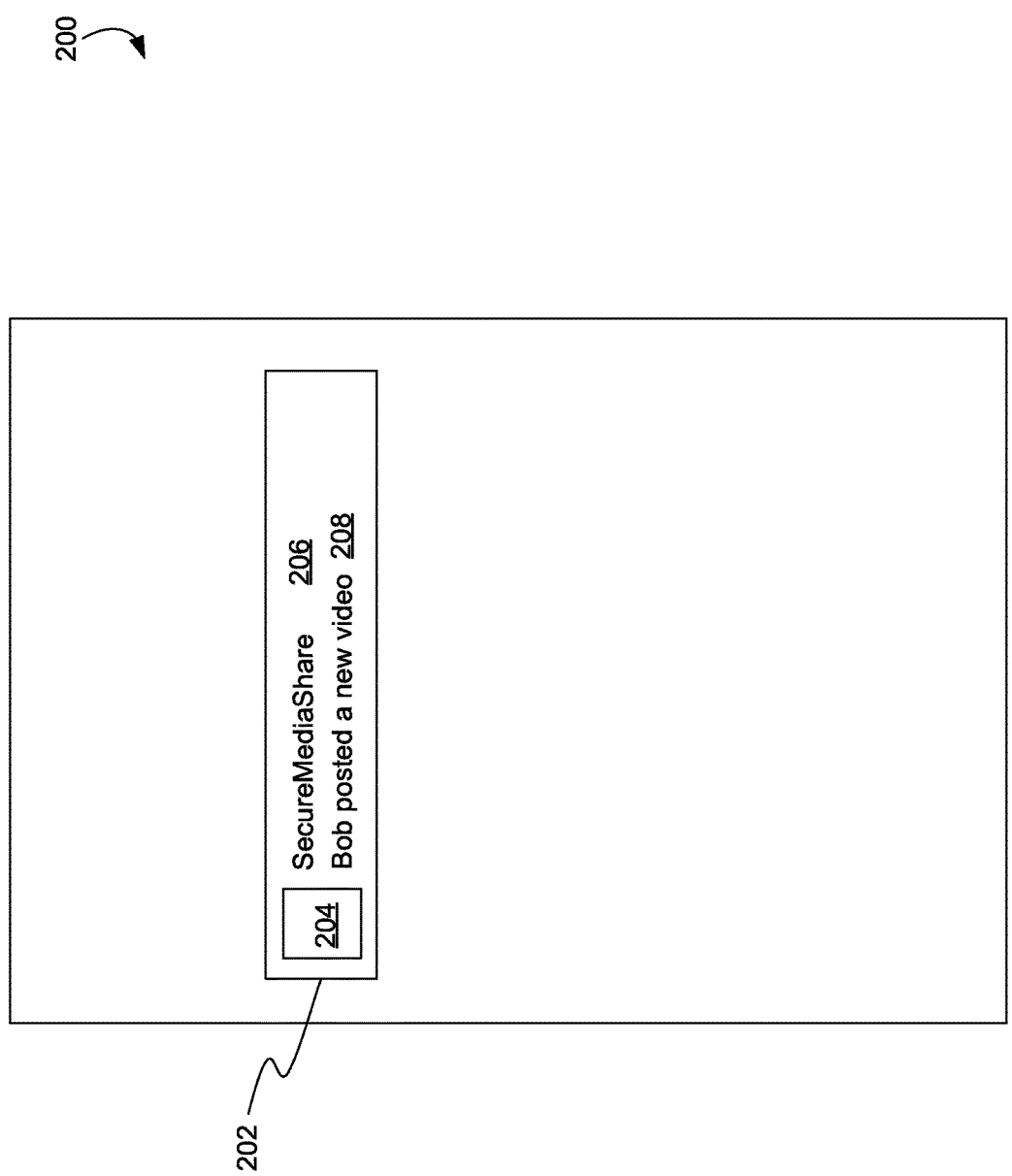
FIG. 2A illustrates an example graphical user interface presenting an initial graphical notification.

FIG. 2A illustrates an example graphical user interface 200 presenting an initial graphical notification. For example, graphical user interface (GUI) 200 can be presented by notification system 120 (e.g., notification daemon 122) on a display of user device 102.

In some implementations, GUI 200 can include graphical notification 202. For example, graphical notification 202 can correspond to the initial notification described above. Graphical notification 202 can include graphical element 204 representing application 106. For example, graphical element 204 can be an image, graphic, icon, branding, trademark, etc., associated with application 106. Graphical notification 202 can include graphical element 206 describing application 106. For example, graphical element 206 can be the name of application 106 and/or the name of a service provided by application 106. Graphical notification 202 can include graphical element 208 representing content (e.g., payload data, processed payload data, etc.) associated with notification message 126. In some implementations, graphical notification 202 can include graphical element 208 representing content associated with unprocessed notification message 134.

Figure 2B:
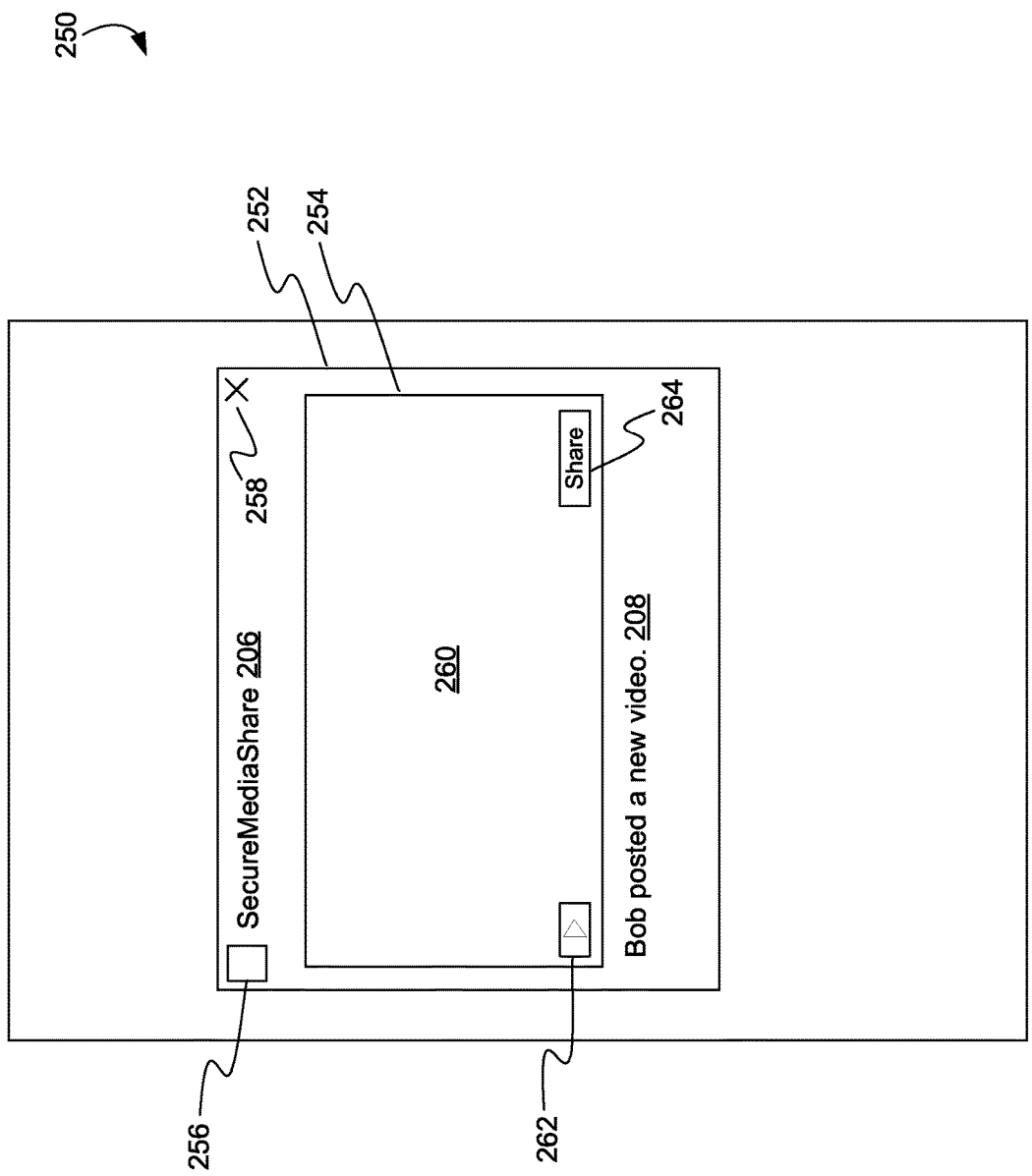
FIG. 2B illustrates an example graphical user interface presenting an expanded notification.

FIG. 2B illustrates an example graphical user interface 250 presenting an expanded notification. For example, GUI 250 can be presented by notification daemon 122 in response to the user selecting (e.g., touch, tap, long touch, pressure touch, slide, drag, swipe, etc.) graphical notification 202 of FIG. 2A.

In some implementations, GUI 250 can include graphical notification 252. For example, graphical notification 252 can be generated by expanding or transforming graphical notification 202 to accommodate graphical element 254 (e.g., an embedded content element) provided by notification daemon 122 in graphical notification 252 for presenting content provided by content extension 110, as described further below.

In some implementations, notification 252 can include graphical element 256 representing application 106. For example, the user can select graphical element 256 to cause notification daemon 122 to invoke application 106. Thus, if the user wishes to interact with application 106 instead of notification 252, the user can invoke application 106 by selecting graphical element 256.

In some implementations, notification 252 can include graphical element 206 as described above. For example, graphical element 206 can be consistent between notification 202 and notification 252 so that the user can easily recognize the relationship between the two notifications and application 106.

In some implementations, notification 252 can include graphical element 208. For example, content extension 110 can determine whether to present graphical element 208 or hide graphical element 208 according to the configuration (e.g., programming, definition, etc.) of content extension 110.

In some implementations, notification 252 can include graphical element 260 for presenting content provided by content extension 110. For example, when notification daemon 122 receives user input selecting notification 202, notification daemon 122 can invoke content extension 110. For example, content extension 110 can present the payload (e.g., content) of notification message 132 and/or notification message 126 in graphical element 260. Thus, while notification daemon 122 provides or presents notification 252, the content extension 110 can provide the content presented in graphical element 260.

In some implementations, notification daemon 122 can invoke content extension 110 by causing extension daemon 124 invoke content extension 110. For example, notification daemon 122 can send a message to extension daemon 124 including the application identifier and content extension category identified in the received notification message. Extension daemon 124 can then invoke or execute the content extension corresponding to the application identifier and category.

In the example of FIG. 2B, notification message 132 can include an encrypted payload from vendor server 130 that provides a reference (e.g., a uniform resource locator "URL") for a video stored on application vendor server 130. For example, application vendor server can provide a secure media sharing service that only allows members of the service (e.g., user's having accounts with the service) to access and view media items stored on vendor server 130. The user of user device 102 has an account with the secure media sharing service and, therefore, has the security keys necessary for decrypting data from vendor server 130 stored on user device 102. Notification message 132 can indicate that service extension 108 should be invoked when notification message 132 is received and indicate that notification message 132 is associated with the "video" category defined by the secure media sharing service.

In response to receiving notification message 132, notification daemon 132 can send notification message 132 to extension daemon 124. Extension daemon 124 can invoke service extension 108 and service extension 108 can decrypt the payload of notification message 132 and/or download the video from application vendor 130 using the URL. Service extension 108 can then provide the decrypted URL and/or downloaded video to extension daemon 126 and extension daemon 126 can generate processed notification 126, including the decrypted URL and/or downloaded video. Extension daemon 126 can send the processed notification message 126 to notification daemon 122 can notification daemon can present initial notification 202 on GUI 200, as described above.

When notification daemon 122 receives the user selection of initial notification 202, as described above, notification daemon 122 can invoke the content extension corresponding to the category (e.g., "video") identified in notification message 132 and/or notification message 126. In this case, notification daemon 122 can invoke content extension 110.

Content extension 110 can generate graphical elements for presenting and controlling the playback of videos, for example.

In some implementations, notification daemon 122 can invoke content extension 110 by causing extension daemon 124 invoke content extension 110. For example, notification daemon 122 can send a message to extension daemon 124 including the application identifier and content extension category identified in the received notification message. Extension daemon 124 can then invoke or execute the content extension corresponding to the application identifier and category.

In some implementations, content extension 110 can present the video identified in processed notification 126 using video control 260 embedded in graphical element 254. For example, content extension 110 can define the size of graphical element 260 so that content extension 110 can present the video and/or video control 260 in an appropriately sized space in notification 252. When video control 260 is presented, content extension 110 can present the video downloaded by service extension 108 in video control 260. Alternatively, content extension 110 can download the video using the URL decrypted by service extension 108 and present the downloaded video in video control 260.

In some implementations, content extension 110 can define the location of controls (e.g., graphical element 262, graphical element 264, etc.) presented on notification 252. As described above, extension configuration 114 can define actions and those actions can correspond to controls defined by content extension 110. In this case, content extension 110 is configured with two actions, a "play" action and a "share" action. Content extension 110 can present controls corresponding to the "play" action (e.g., graphical element 262) and the "share" action (e.g., graphical element 264) on notification 252 so that the user can provide input to initiate play back of the video presented in video control 260 and/or share the video with other users of the secure media sharing service. For example, in response to the user selecting graphical element 262 and/or graphical element 264, notification daemon 122 can call content extension 110 and provide the action label (e.g., "play", "share") corresponding to the selection control to content extension 110. Content extension 110 can then perform the appropriate action (e.g., play the video, send a share message to vendor server 130, etc.) based on the action selected by the user.

In some implementations, notification 252 can include graphical element 258 for dismissing notification 252. For example, in response to the user selecting graphical element 258, notification daemon 122 can close notification 252. Alternatively, content extension 110 can close notification 252 in response to the user selecting an action (e.g., the "share" action represented by graphical element 264).

Example Use Case—Encrypted Photo Notification

Figure 3A:
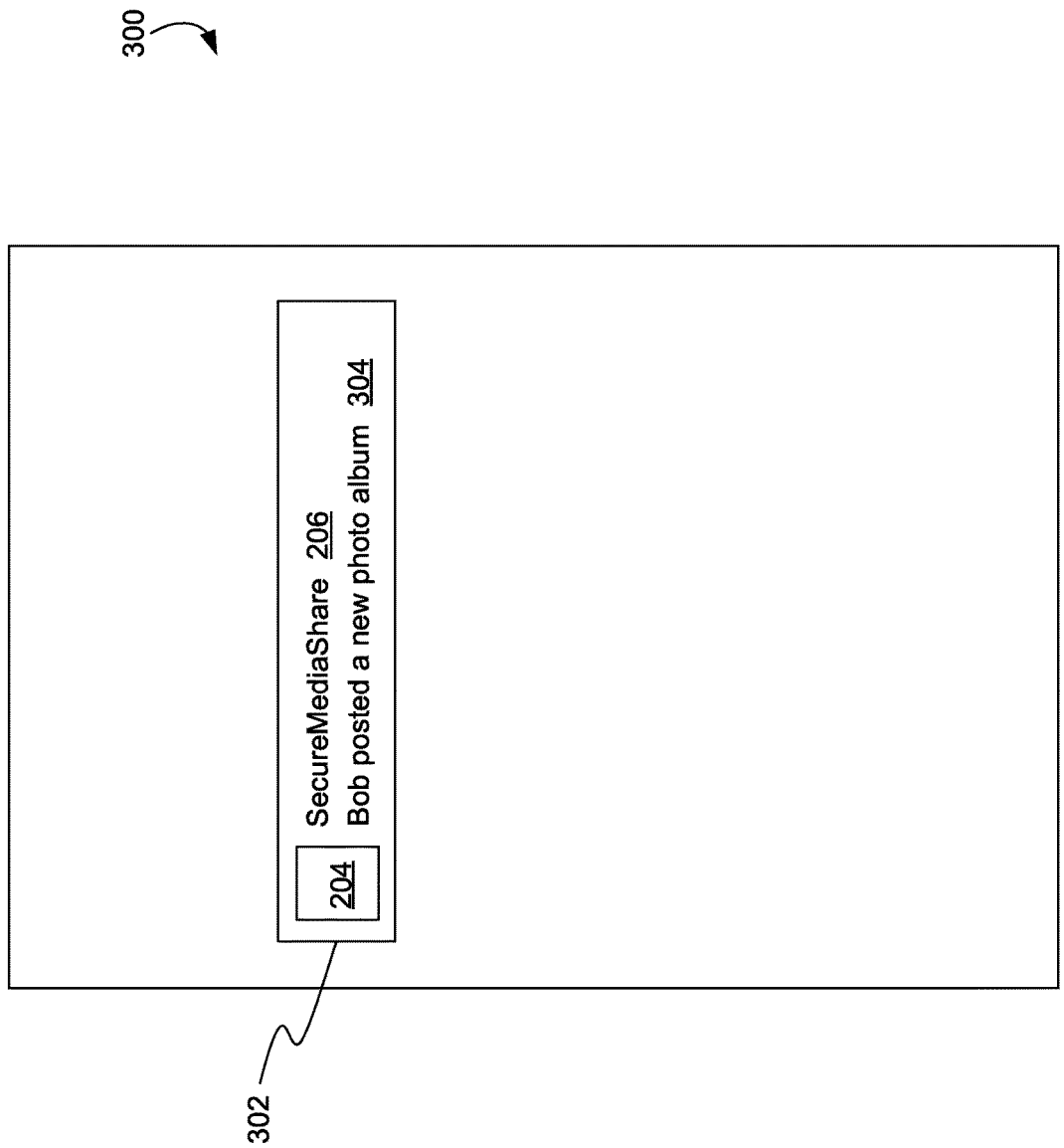
FIG. 3A illustrates an example graphical user interface for presenting an initial graphical notification.

FIG. 3A illustrates an example graphical user interface 300 for presenting an initial graphical notification. For example, GUI 300 can be presented by notification system 120 (e.g., notification daemon 122) on a display of user device 102.

In some implementations, GUI 300 can include graphical notification 302. For example, graphical notification 302 can correspond to the initial notification described above. Graphical notification 302 can include graphical element 204 representing application 106. For example, graphical element 204 can be an image, graphic, icon, branding, trademark, etc., associated with application 106. Graphical notification 302 can include graphical element 206 describing application 106. For example, graphical element 206 can be the name of application 106 and/or the name of a service provided by application 106. Graphical notification 302 can include graphical element 304 representing content (e.g., payload data, processed payload data, etc.) associated with processed notification message 126. In some implementations, graphical notification 302 can include graphical element 304 representing content associated with unprocessed notification message 134. In this case, graphical element 304 can indicate that member "Bob" posted a new photo album to the secure media sharing service described above.

Figure 3B:
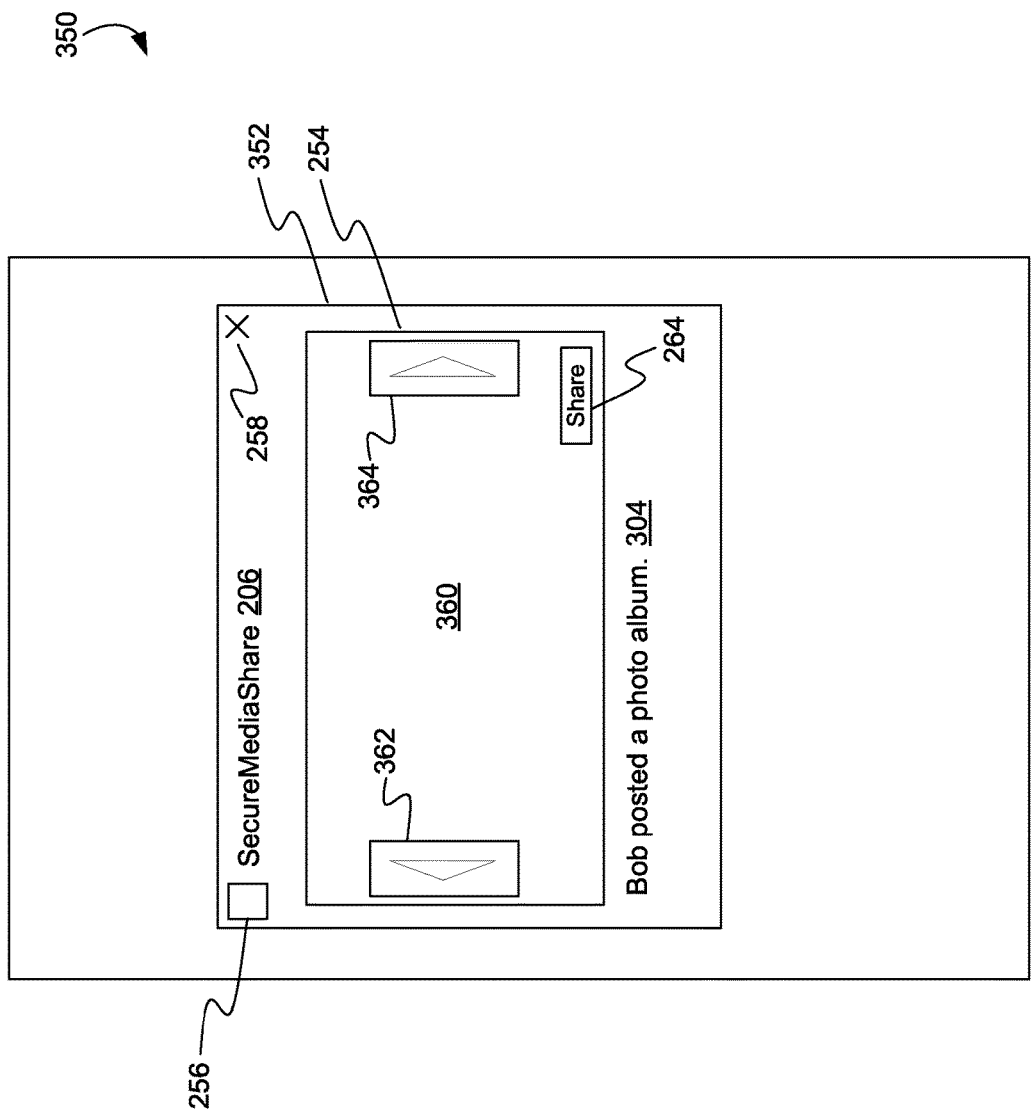
FIG. 3B illustrates an example graphical user interface presenting an expanded notification.

FIG. 3B illustrates an example graphical user interface 350 presenting an expanded notification. For example, GUI 350 can be presented by notification daemon 122 in response to the user selecting (e.g., touch, tap, long touch, pressure touch, slide, drag, swipe, etc.) graphical notification 302 of FIG. 3A.

In some implementations, GUI 350 can include graphical notification 352. For example, graphical notification 352 can be generated by expanding or transforming graphical notification 302 to accommodate graphical element 254 (e.g., an embedded content element) provided by notification daemon 122 in graphical notification 352 for presenting content provided by content extension 112, as described further below.

In some implementations, notification 352 can include graphical element 256 representing application 106. For example, the user can select graphical element 256 to cause notification daemon 122 to invoke application 106. Thus, if the user wishes to interact with application 106 instead of notification 352, the user can invoke application 106 by selecting graphical element 256.

In some implementations, notification 352 can include graphical element 206 as described above. For example, graphical element 206 can be consistent between notification 302 and notification 352 so that the user can easily recognize the relationship between the two notifications and application 106.

In some implementations, notification 352 can include graphical element 304. For example, content extension 112 can determine whether to present graphical element 304 or hide graphical element 304 according to the configuration (e.g., programming, definition, etc.) of content extension 112.

In some implementations, notification 352 can include graphical element 352 for presenting content provided by content extension 112. For example, when notification daemon 122 receives user input selecting notification 302, notification daemon 122 can invoke content extension 112. For example, content extension 112 can present the payload (e.g., content) of notification message 132 and/or notification message 124 in graphical element 352. Thus, while notification daemon 122 provides or presents notification 352, content extension 112 can provide the content presented in graphical element 352.

In some implementations, notification daemon 122 can invoke content extension 112 by causing extension daemon 124 invoke content extension 112. For example, notification daemon 122 can send a message to extension daemon 124 including the application identifier and content extension category identified in the received notification message. Extension daemon 124 can then invoke or execute the content extension corresponding to the application identifier and category.

In the example of FIG. 2B, notification message 132 can include an encrypted payload from vendor server 130 that provides a reference (e.g., a uniform resource locator "URL") for a photo album stored on application vendor server 130. For example, application vendor server can provide a secure media sharing service that only allows members of the service (e.g., user's having accounts with the service) to access and view media items stored on vendor server 130. The user of user device 102 has an account with the secure media sharing service and, therefore, has the security keys necessary for decrypting data from vendor server 130 stored on user device 102. Notification message 132 can indicate that service extension 108 should be invoked when notification message 132 is received and can indicate that notification message 132 is associated with the "B" category defined in extension configuration 114 by the secure media sharing service.

In response to receiving notification message 132, notification daemon 132 can send notification message 132 to extension daemon 124. Extension daemon 124 can invoke service extension 108 and service extension 108 can decrypt the payload of notification message 132 and/or download the photo album from application vendor 130 using the URL. Service extension 108 can then provide the decrypted URL and/or downloaded photo album to extension daemon 126 and extension daemon 126 can generate processed notification 126, including the decrypted URL and/or downloaded photo album. Extension daemon 126 can send the processed notification message 126 to notification daemon 122 can notification daemon can present initial notification 302 on GUI 300, as described above.

When notification daemon 122 receives the user selection of initial notification 302, as described above, notification daemon 122 can invoke the content extension corresponding to the category (e.g., "B") identified in notification message 132 and/or notification message 126. In this case, notification daemon 122 can invoke content extension 112. Content extension 112 can generate graphical elements (e.g., control elements) for presenting and controlling the presentation of photos in a photo album, for example.

In some implementations, notification daemon 122 can invoke content extension 112 by causing extension daemon 124 invoke content extension 112. For example, notification daemon 122 can send a message to extension daemon 124 including the application identifier and content extension category identified in the received notification message. Extension daemon 124 can then invoke or execute the content extension corresponding to the application identifier and category.

In some implementations, content extension 112 can present the photo album identified in processed notification 126 using photo album control 360 embedded in graphical element 254. For example, content extension 112 can define the size of graphical element 352 so that content extension 112 can present the photo album and/or photo album control 360 in an appropriately sized space in notification 352. When photo album control 360 is presented, content extension 112 can present the photo album downloaded by service extension 108 in photo album control 360. Alternatively, content extension 112 can download the photo album using the URL decrypted by service extension 108 and present the downloaded photo album in photo album control 360.

In some implementations, content extension 112 can define the location of controls (e.g., graphical element 362, graphical element 364, graphical element 264, etc.) presented on notification 352. As described above, extension configuration 114 can define actions and those actions can correspond to controls defined by content extension 112. In this case, content extension 112 is configured with three actions: a "previous" action, a "next" action, and a "share" action. Content extension 112 can present controls corresponding to the "previous" action (e.g., graphical element 362), the "next" action (e.g., graphical element 364) and the "share" action (e.g., graphical element 264) on notification 352 so that the user can provide input to move to the next photo in the photo album, move to the previous photo in the photo album, and/or share the photo album presented in photo album control 360 with other users of the secure media sharing service. For example, in response to the user selecting graphical element 362, graphical element 264, and/or graphical element 264, notification daemon 122 can call content extension 122 and provide the action label (e.g., "previous", "next", "share", etc.) corresponding to the user selected control to content extension 112. Content extension 112 can then perform the appropriate action (e.g., present the previous photo, present the next photo, send a share message to vendor server 130, etc.) based on the action selected by the user.

In some implementations, notification 352 can include graphical element 258 for dismissing notification 352. For example, in response to the user selecting graphical element 258, notification daemon 122 can close notification 352. Alternatively, content extension 112 can close notification 352 in response to the user selecting an action (e.g., the "share" action represented by graphical element 264).

Other Use Cases

There are many different features that can be implemented in notifications using the application notification extensions described above. In some implementations, an expanded notification similar to graphical notification 252 and/or graphical notification 352 can present a map generated by a service extension and presented by a content extension. For example, a notification message can be received that indicates map coordinates, the service extension can download map data corresponding to the coordinates, and the content extension can present a representation of a map within a graphical notification presented on user device 102.

In some implementations, an expanded notification similar to graphical notification 252 and/or graphical notification 352 can present a text messages received over a network connection (e.g., session) created by a service extension. The received text messages can be presented by the content extension on the graphical notification. For example, a notification message can be received that indicates a new text message is available for the user of user device 102, the service extension can establish a network connection to the text messaging service that sent the notification message, and the content extension can use the network connection to receive text messages, send text messages based on input from the user, and present text messages within a graphical notification presented on user device 102. The content extension can keep the graphical notification on the display of user device 102 until the user dismisses the graphical notification.

In some implementations, service extensions and/or content extensions can be configured to generate read receipts. For example, an application vendor can send a user visible notification message to user device 102. Notification system 120 can invoke a corresponding service extension or content extension that establishes a network connection and sends a message to the vendor's server indicating that the message has been presented or read by the user. For example, the service extension can send a message to the vendor's server indicating that the notification message was received by user device 102. Because the content extension is invoked in response to the user selecting an initial graphical notification, thus the content extension can send a message to the vendor's server indicating that the notification was acted upon or read by the user when invoked.

Example Process

Figure 4:
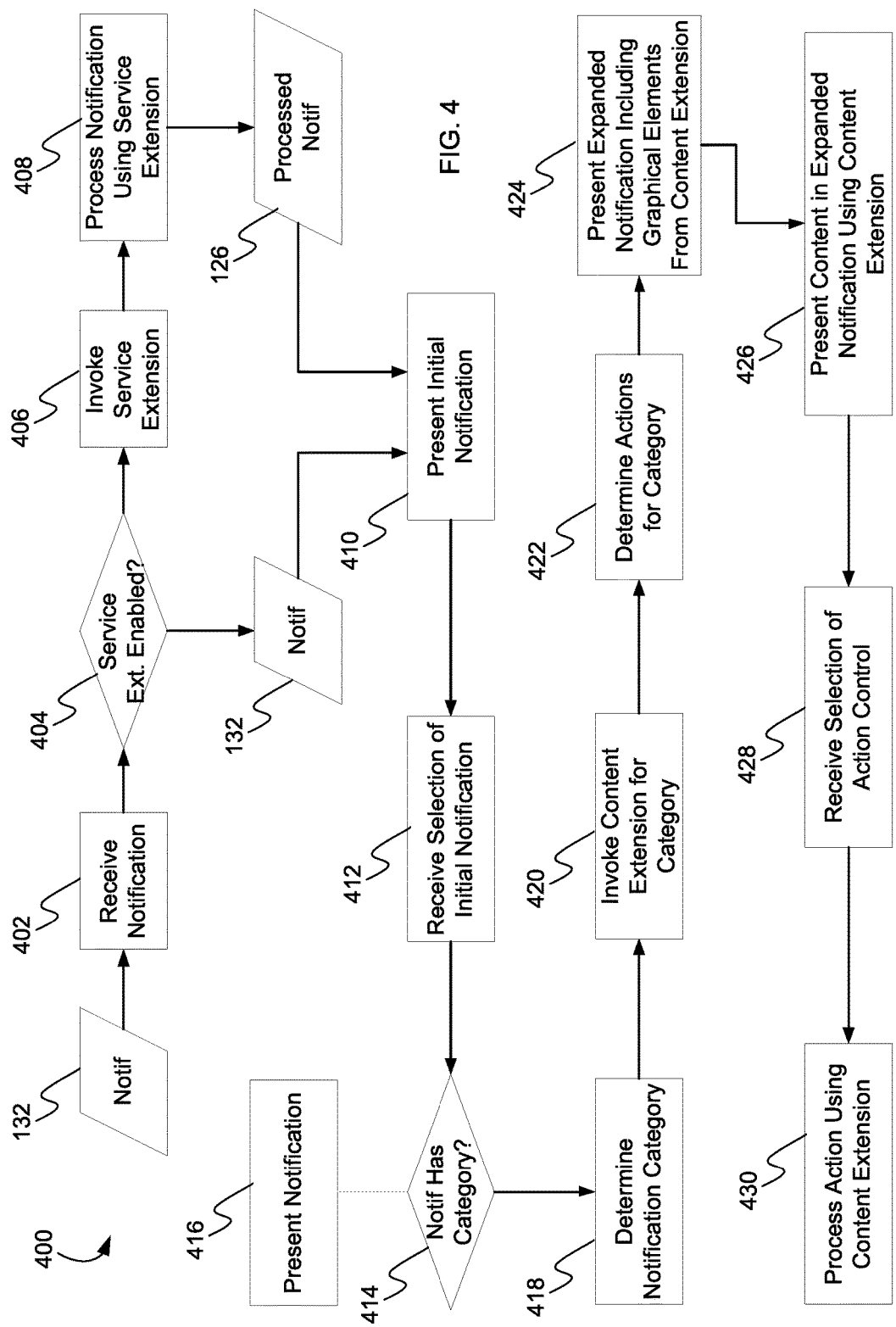
FIG. 4 is flow diagram of an example process for processing notifications using notification extensions for applications.

FIG. 4 is flow diagram of an example process 400 for processing notifications using notification extensions for applications. For example, user device 102 can process notifications associated with applications installed on user device 102 using application extensions (e.g., service extensions, content extensions, etc.) provided by application vendors in the application bundle for the installed applications.

At step 402, user device 102 can receive notification message 132. For example, notification message 132 can include an identifier for an application on user device 102, an indication (e.g., true/false) whether to invoke the service extension for the identified application, a label for a content extension category, and a notification payload (e.g., content to be presented to the user).

At step 404, user device 102 can determine whether a service extension should be invoked for notification message 132. For example, when notification message 132 indicates that the service extension should not be invoked (e.g., a false value), then user device 102 can present an initial graphical notification (e.g. graphical notification 202/302) on a display of user device 102 based on notification message 132 at step 410. When notification message 132 indicates that the service extension should be invoked (e.g., a false value), then user device 102 can invoke the service extension for the application to process notification message 132 at step 406.

At step 408, user device 102 can process notification message 132 using the invoked service extension. For example, the service extension can process the payload (e.g., content) of notification message 132 according to vendor-specific instructions encoded in the service extension to generate processed notification message 126.

At step 410, user device 102 can present an initial notification on a display of user device 102. For example, user device 102 can present an initial graphical notification (e.g., graphical notification 202/302) representing notification message 132 when the service extension for the application is not invoked. User device 102 can present an initial graphical notification (e.g., graphical notification 202/302) representing processed notification message 126 when the service extension for the application is invoked.

At step 412, user device 102 can receive a selection of the initial graphical notification. For example, user device 102 can receive user input selecting graphical notification 202/302, as described above.

At step 414, user device 102 can determine whether the notification message specifies a content extension category. For example, even in cases where notification 132 has not been processed by the service extension, notification 132 can identify a category that can be used to identify a content extension for presenting the payload of notification message 132 to the user. If the notification message (e.g., notification message 132/126) does not identify a category, user device 102 can present a graphical representation of notification message 132/126 using default or native graphical notification presentation features of user device 102. If notification message 132/126 identifies a content extension category, user device 102 can determine the content extension category for the notification at step 418.

At step 420, user device 102 can invoke the content extension corresponding to the determined category. For example, an application bundle installed on user device 102 may have multiple content extensions. Each content extension can be associated with a different category. Thus, user device 102 can determine which content extension to invoke for an application based on the category identified in the received notification message.

At step 422, user device 102 can determine the actions defined for the category. For example, user device 102 can determine the actions defined for the category based on extension configuration 114, as described above.

At step 424, user device 102 can present an expanded graphical notification including graphical elements from the invoked content extension. For example, user device 102 can present an enlarged graphical notification that provides controls for embedded graphical elements provided by the invoked content extension in the graphical notification.

At step 426, user device 102 can present content in the expanded notification using the invoked content extension. Since the content extension is configured by the application vendor and delivered with the application bundle, the content extension may allow the application vendor to configure the content extension to present content in a native graphical notification in an application or vendor specific way.

At step 428, user device 102 can receive a user selection of an action control presented on the expanded graphical notification. For example, the action control can be a graphical element presented on the graphical notification and associated with an action defined by the invoked control extension. When the user selects the action control, user device 102 can send a message to the content extension indicating that an action associated with the content extension has been selected by the user. The content extension can then process the action (e.g., the user input) at step 430. Thus, application vendors can provide vendor specific functionality using native (e.g., built in, device-specific, operating system specific, etc.) notification features of user device 102.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 5:
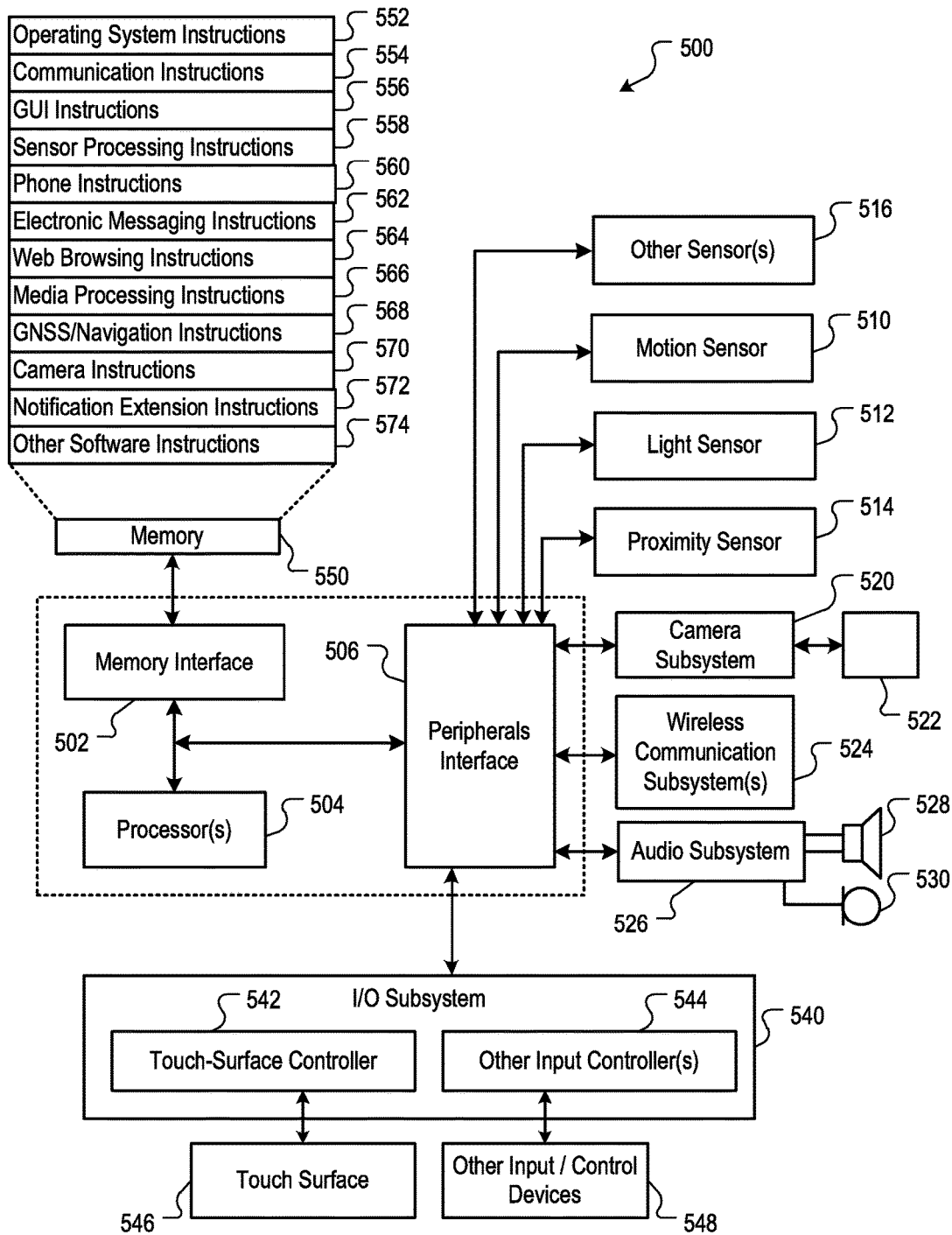
FIG. 5 is a block diagram of an example computing device that can implement the features and processes of FIGS. 1-4.

FIG. 5 is a block diagram of an example computing device 500 that can implement the features and processes of FIGS. 1-4. The computing device 500 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. The various components in the computing device 500 can be coupled by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate orientation, lighting, and proximity functions. Other sensors 516 can also be connected to the peripherals interface 506, such as a global navigation satellite system (GNSS) (e.g., GPS receiver), a temperature sensor, a biometric sensor, magnetometer or other sensing device, to facilitate related functionalities.

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips. The camera subsystem 520 and the optical sensor 522 can be used to collect images of a user to be used during authentication of a user, e.g., by performing facial recognition analysis.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the computing device 500 is intended to operate. For example, the computing device 500 can include communication subsystems 524 designed to operate over a GSM network, a GPRS network, an EDGE network, a Wi-Fi or WiMax network, and a Bluetooth™ network. In particular, the wireless communication subsystems 524 can include hosting protocols such that the device 100 can be configured as a base station for other wireless devices.

An audio subsystem 526 can be coupled to a speaker 528 and a microphone 530 to facilitate voice-enabled functions, such as speaker recognition, voice replication, digital recording, and telephony functions. The audio subsystem 526 can be configured to facilitate processing voice commands, voiceprinting and voice authentication, for example.

The I/O subsystem 540 can include a touch-surface controller 542 and/or other input controller(s) 544. The touch-surface controller 542 can be coupled to a touch surface 546. The touch surface 546 and touch-surface controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration can disengage a lock of the touch surface 546; and a pressing of the button for a second duration that is longer than the first duration can turn power to the computing device 500 on or off. Pressing the button for a third duration can activate a voice control, or voice command, module that enables the user to speak commands into the microphone 530 to cause the device to execute the spoken command. The user can customize a functionality of one or more of the buttons. The touch surface 546 can, for example, also be used to implement virtual or soft buttons and/or a keyboard.

In some implementations, the computing device 500 can present recorded audio and/or video files, such as MP3, AAC, and MPEG files. In some implementations, the computing device 500 can include the functionality of an MP3 player, such as an iPod™. The computing device 500 can, therefore, include a 36-pin connector that is compatible with the iPod. Other input/output and control devices can also be used.

The memory interface 502 can be coupled to memory 550. The memory 550 can include high-speed random access memory and/or non-volatile memory, such as one or more magnetic disk storage devices, one or more optical storage devices, and/or flash memory (e.g., NAND, NOR).

The memory 550 can store an operating system 552, such as Darwin, RTXC, LINUX, UNIX, OS X, WINDOWS, or an embedded operating system such as VxWorks.

The operating system 552 can include instructions for handling basic system services and for performing hardware dependent tasks. In some implementations, the operating system 552 can be a kernel (e.g., UNIX kernel). In some implementations, the operating system 552 can include instructions for performing voice authentication. For example, operating system 552 can implement the application notification extension features as described with reference to FIGS. 1-4.

The memory 550 can also store communication instructions 554 to facilitate communicating with one or more additional devices, one or more computers and/or one or more servers. The memory 550 can include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions; and/or camera instructions 570 to facilitate camera-related processes and functions.

The memory 550 can store other software instructions 572 to facilitate other processes and functions, such as the application notification extension processes and functions as described with reference to FIGS. 1-4.

The memory 550 can also store other software instructions 574, such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the computing device 500 can be implemented in hardware and/or in software, including in one or more signal processing and/or application specific integrated circuits.

What is claimed is:

1. A method comprising:
   receiving, by a user device, a notification from a notification server;
   determining, by the user device, an application associated with the notification;
   determining, by the user device, whether a service extension associated with the application should be invoked to process the notification;
   invoking, by the user device, the service extension when the notification indicates that the service extension should be invoked;
   processing, by the user device, the notification using the service extension;
   presenting, by the user device, a first graphical notification representing the notification.

2. The method of claim 1, further comprising:
   receiving, by the user device, a first user input selecting the first graphical notification;
   in response to the first user input, invoking, by the user device, a content extension associated with the application; and
   presenting, by the user device, a second graphical notification including content generated by the service extension and graphical elements generated by the content extension.

3. The method of claim 1, further comprising:
   determining, by the user device, whether the service extension associated with the application should be invoked to process the notification based on service extension data included in the notification.

4. The method of claim 1, where the service extension is configured to download data identified in the notification from a network server.

5. The method of claim 1, where the service extension is configured to decrypt data specified by the notification.

6. The method of claim 2, where the content extension is configured to process media specified by the notification for presentation on a display of a computing device.

7. A non-transitory computer readable medium including one or more sequences of instructions that, when executed by one or more processors, causes:
   receiving, by a user device, a notification from a notification server;
   determining, by the user device, an application associated with the notification;
   determining, by the user device, whether a service extension associated with the application should be invoked to process the notification;
   invoking, by the user device, the service extension when the notification indicates that the service extension should be invoked;
   processing, by the user device, the notification using the service extension;
   presenting, by the user device, a first graphical notification representing the notification.

8. The non-transitory computer readable medium of claim 7, wherein the instructions cause:
   receiving, by the user device, a first user input selecting the first graphical notification;
   in response to the first user input, invoking, by the user device, a content extension associated with the application; and
   presenting, by the user device, a second graphical notification including content generated by the service extension and graphical elements generated by the content extension.

9. The non-transitory computer readable medium of claim 7, wherein the instructions cause:
   determining, by the user device, whether the service extension associated with the application should be invoked to process the notification based on service extension data included in the notification.

10. The non-transitory computer readable medium of claim 7, where the service extension is configured to download data identified in the notification from a network server.

11. The non-transitory computer readable medium of claim 7, where the service extension is configured to decrypt data specified by the notification.

12. The non-transitory computer readable medium of claim 8, where the content extension is configured to process media specified by the notification for presentation on a display of a computing device.

13. A system comprising:
one or more processors; and
a non-transitory computer readable medium including one or more sequences of instructions that, when executed by one or more processors, causes:
  receiving, by a user device, a notification from a notification server;
  determining, by the user device, an application associated with the notification;
  determining, by the user device, whether a service extension associated with the application should be invoked to process the notification;
  invoking, by the user device, the service extension when the notification indicates that the service extension should be invoked;
  processing, by the user device, the notification using the service extension;
  presenting, by the user device, a first graphical notification representing the notification.

14. The system of claim 13, wherein the instructions cause:
  receiving, by the user device, a first user input selecting the first graphical notification;
  in response to the first user input, invoking, by the user device, a content extension associated with the application; and
  presenting, by the user device, a second graphical notification including content generated by the service extension and graphical elements generated by the content extension.

15. The system of claim 13, wherein the instructions cause:
  determining, by the user device, whether the service extension associated with the application should be invoked to process the notification based on service extension data included in the notification.

16. The system of claim 13, where the service extension is configured to download data identified in the notification from a network server.

17. The system of claim 13, where the service extension is configured to decrypt data specified by the notification.

18. The system of claim 14, where the content extension is configured to process media specified by the notification for presentation on a display of a computing device.

* * * * *